United States Patent
Su

(10) Patent No.: US 11,381,751 B2
(45) Date of Patent: Jul. 5, 2022

(54) HANDHELD GIMBAL CONTROL METHOD, HANDHELD GIMBAL, AND HANDHELD DEVICE

(71) Applicant: SZ DJI TECHNOLOGY CO., LTD., Shenzhen (CN)

(72) Inventor: Guanliang Su, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/178,075

(22) Filed: Feb. 17, 2021

(65) Prior Publication Data
US 2021/0168296 A1 Jun. 3, 2021

Related U.S. Application Data

(63) Continuation of application No. PCT/CN2018/105484, filed on Sep. 13, 2018.

(51) Int. Cl.
*H04N 5/225* (2006.01)
*H04N 5/232* (2006.01)
(Continued)

(52) U.S. Cl.
CPC ......... *H04N 5/23299* (2018.08); *F16M 11/10* (2013.01); *F16M 11/2071* (2013.01);
(Continued)

(58) Field of Classification Search
CPC ........... H04N 5/232933; H04N 5/2251; H04N 5/23245; H04N 5/23218; H04N 5/232945;
(Continued)

(56) References Cited

U.S. PATENT DOCUMENTS

| 2014/0101310 A1 | 4/2014 | Savage et al. | |
| 2020/0041878 A1* | 2/2020 | Lan | G08C 23/04 |
| 2020/0104598 A1* | 4/2020 | Qian | G06V 20/20 |

FOREIGN PATENT DOCUMENTS

| CN | 101035271 A | 9/2007 |
| CN | 103984193 A | 8/2014 |

(Continued)

OTHER PUBLICATIONS

The World Intellectual Property Organization (WIPO) International Search Report for PCT/CN2018/105484 datd Jun. 3, 2019 3 Pages (including translation).

*Primary Examiner* — Robert Chevalier
(74) *Attorney, Agent, or Firm* — Anova Law Group, PLLC

(57) ABSTRACT

A handheld gimbal includes a handheld part and a gimbal. The handheld part is configured with a human-machine interface component. The gimbal is mounted at the handheld part and configured to mount a camera device to photograph a target object. The human-machine interface component includes a display screen and a processor. The display screen is configured to display a photographing image captured by the camera device. The photographing image includes an image of the target object. The processor is configured to automatically recognize the target object, obtain a motion instruction of controlling a motion of the gimbal according to a motion status of the image of the target object, and control the motion of the gimbal according to the motion instruction.

19 Claims, 6 Drawing Sheets

(51) Int. Cl.
*F16M 11/10* (2006.01)
*F16M 11/20* (2006.01)
*F16M 13/04* (2006.01)
*G03B 17/56* (2021.01)
*G05D 3/20* (2006.01)
*H04N 5/228* (2006.01)

(52) U.S. Cl.
CPC ........... *F16M 13/04* (2013.01); *G03B 17/561* (2013.01); *G05D 3/20* (2013.01); *H04N 5/2253* (2013.01); *H04N 5/23218* (2018.08); *H04N 5/23245* (2013.01); *H04N 5/232933* (2018.08); *H04N 5/232945* (2018.08)

(58) Field of Classification Search
CPC ........... H04N 5/23299; H04N 5/23254; H04N 5/2253; F16M 11/18; F16M 11/2071; F16M 11/123; F16M 11/10; F16M 13/04; F16M 2200/044; F16M 2200/041; G05D 3/20; G03B 17/561
USPC .......... 348/169, 174, 175, 180, 184, 208.99, 348/208.1, 208.2, 208.4, 208.14
See application file for complete search history.

(56) References Cited

FOREIGN PATENT DOCUMENTS

| | | | |
|---|---|---|---|
| CN | 204420520 U | | 6/2015 |
| CN | 105744234 A | | 7/2016 |
| CN | 105937697 A | | 9/2016 |
| CN | 205610783 U | | 9/2016 |
| CN | 205908975 U | | 1/2017 |
| CN | 106716985 A | | 5/2017 |
| CN | 107466471 A | | 12/2017 |
| CN | 206988780 U | | 2/2018 |
| CN | 108323192 A | | 7/2018 |
| CN | 207634925 U | | 7/2018 |
| CN | 108476288 A | | 8/2018 |
| CN | 108513608 A | | 9/2018 |
| JP | 2014042727 A | * | 3/2014 |
| TW | 201513032 A | | 4/2015 |
| WO | 2018137134 A1 | | 8/2018 |

* cited by examiner

HANDHELD GIMBAL CONTROL METHOD, HANDHELD GIMBAL, AND HANDHELD DEVICE

CROSS-REFERENCE TO RELATED APPLICATION

This application is a continuation of International Application No. PCT/CN2018/105484, filed Sep. 13, 2018, the entire content of which is incorporated herein by reference.

TECHNICAL FIELD

The present disclosure generally relates to the gimbal technology field and, more particularly, to a handheld gimbal control method, a handheld gimbal, and a handheld device.

BACKGROUND

In related technology, a camera is generally mounted at a gimbal, which is configured to increase stability for the camera. When recording a video, the camera may move as a target object moves. If the gimbal cannot follow the speed of the target object when controlling the camera to move, video recording may be affected, and video quality recorded by the camera may not be ensured.

SUMMARY

Embodiments of the present disclosure provide a handheld gimbal including a handheld part and a gimbal. The handheld part is configured with a human-machine interface component. The gimbal is mounted at the handheld part and configured to mount a camera device to photograph a target object. The human-machine interface component includes a display screen and a processor. The display screen is configured to display a photographing image captured by the camera device. The photographing image includes an image of the target object. The processor is configured to automatically recognize the target object, obtain a motion instruction of controlling a motion of the gimbal according to a motion status of the image of the target object, and control the motion of the gimbal according to the motion instruction.

Embodiments of the present disclosure provide a handheld device including a handheld gimbal. The handheld gimbal includes a handheld part and a gimbal. The handheld part is configured with a human-machine interface component. The gimbal is mounted at the handheld part and configured to mount a camera device to photograph a target object. The human-machine interface component includes a display screen and a processor. The display screen is configured to display a photographing image captured by the camera device. The photographing image includes an image of the target object. The processor is configured to automatically recognize the target object, obtain a motion instruction of controlling a motion of the gimbal according to a motion status of the image of the target object, and control the motion of the gimbal according to the motion instruction.

Embodiments of the present disclosure provide a handheld gimbal including a handheld part and a gimbal. The handheld part is configured with a human-machine interface component. The gimbal is mounted at the handheld part and configured to mount a camera device to photograph a target object. The human-machine interface component includes a display screen and a processor. The display screen is configured to display a photographing image captured by the camera device. The photographing image includes an image of the target object. The processor is configured to obtain a motion instruction of controlling a motion of the gimbal according to a motion status of the image of the target object and control the motion of the gimbal according to the motion instruction.

REFERENCE NUMERALS

Figure 1:
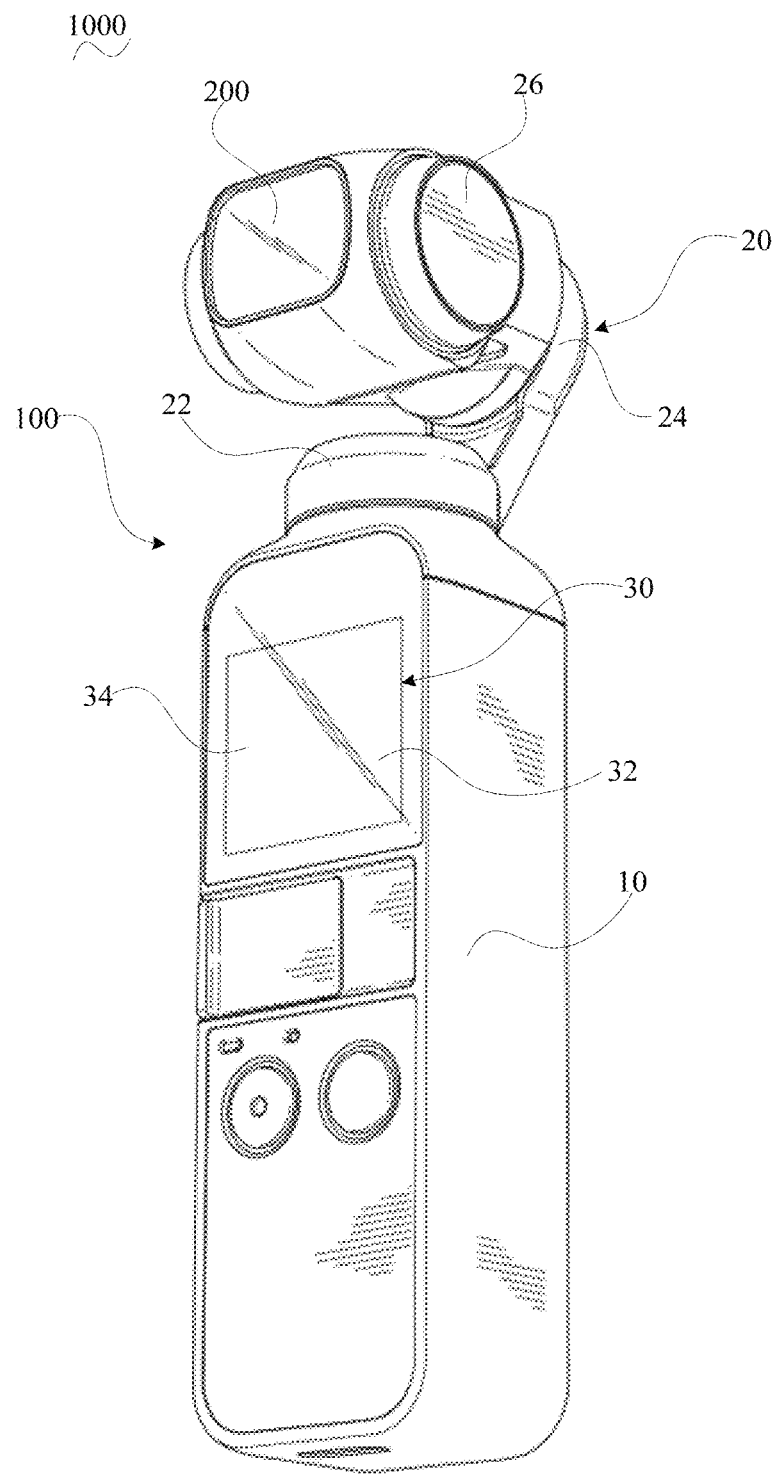
FIG. 1 is a schematic perspective diagram of an exemplary handheld device according to some embodiments of the present disclosure.
Figure 2:
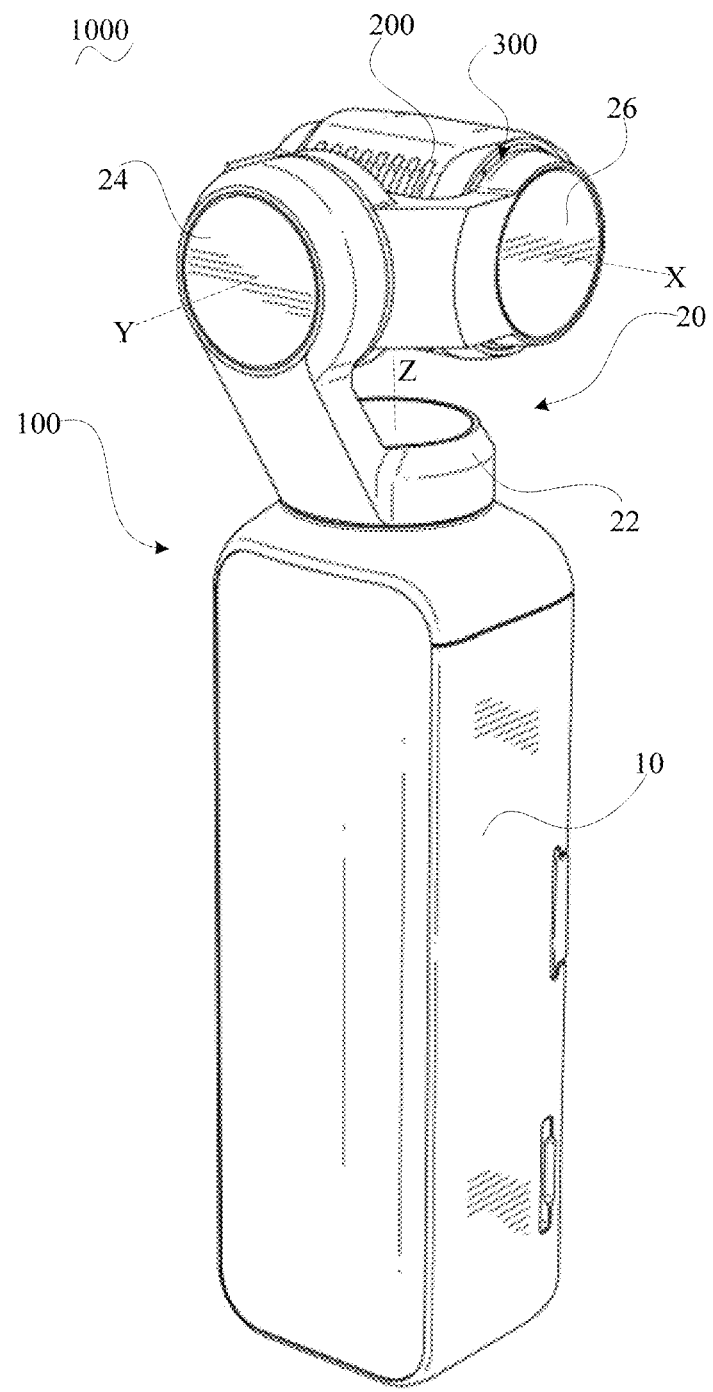
FIG. 2 is another schematic perspective diagram of the exemplary handheld device according to some embodiments of the present disclosure.
Figure 3:
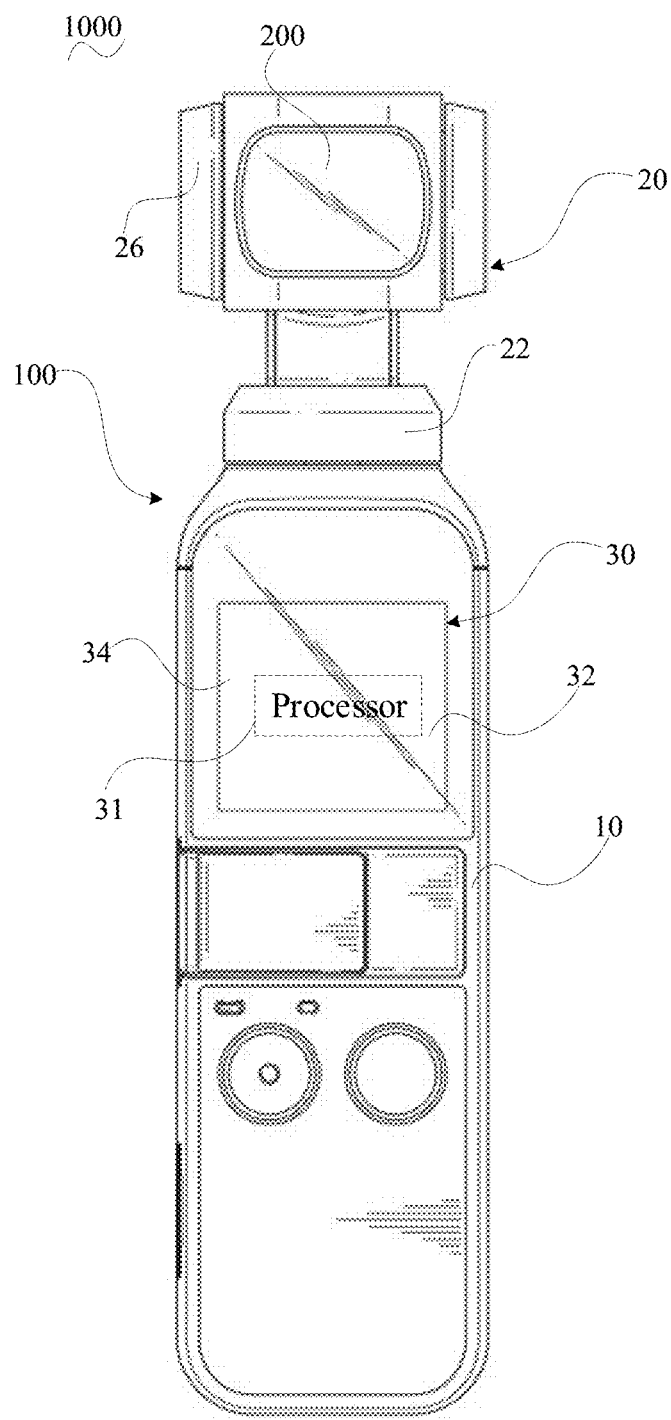
FIG. 3 is a front view of an exemplary handheld device according to some embodiments of the present disclosure.
Figure 4:
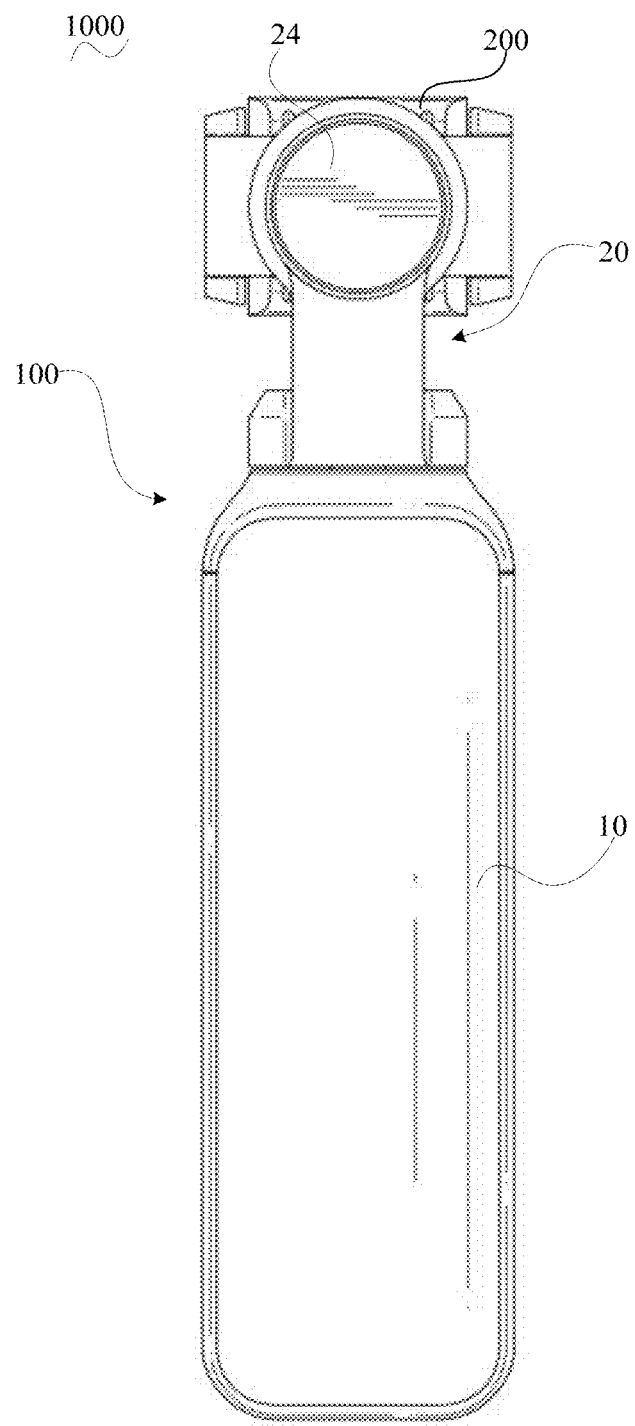
FIG. 4 is a rear view of an exemplary handheld device according to some embodiments of the present disclosure.
Figure 5:
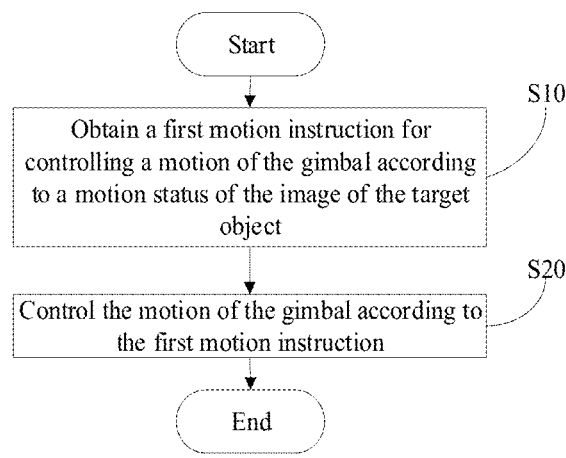
FIG. 5 is a schematic flowchart of an exemplary handheld gimbal control method according to some embodiments of the present disclosure.

Handheld gimbal 100, Handheld part 10, Gimbal 20, First axial assembly 22, Second axial assembly 24, Third axial assembly 26, Human-machine interface component 30, Processor 31, Display screen 32, Tracking box 33, Touch screen 34, Handheld device 1000, Camera device 200, Load connection piece 300, and Human face 500.

DETAILED DESCRIPTION OF THE EMBODIMENTS

Embodiments of the present disclosure are described below. Examples of embodiments of the present disclosure are shown in accompanying drawings. The same or similar reference numerals indicate the same or similar elements or elements with the same or similar functions. Embodiments described by the accompanying drawings are examples, which are used to explain the present disclosure and cannot be considered as limitations to the present disclosure.

In the description of the present disclosure, the terms "first" and "second" are only used for descriptive purposes, and cannot be understood as indicating or implying relative importance or implicitly indicating a number of indicated technical features. Therefore, the features defined with "first" and "second" may explicitly or implicitly include one or more of the features. In the description of the present disclosure, "multiple" means two or more than two, unless otherwise specified.

In the description of the present disclosure, the terms "mounting," "connection," and "coupling" should be understood in a broad sense. For example, the terms may indicate a fixed connection, a detachable connection, an integral connection, a mechanical connection, an electrical connection, a communication, a direct connection, an indirect connection through an intermediary, internal communication of two components, or interaction relationship of two components. Those of ordinary skill in the art should understand the specific meanings of the above terms in embodiments of the present disclosure according to specific situations.

The present disclosure provides many different embodiments or examples for realizing different structures of the present disclosure. To simplify the present disclosure, components and settings of specific examples are described below, which are only examples and are not intended to limit the present disclosure. In addition, the present disclosure may repeat reference numerals and/or reference letters in different examples, and this repetition is for the purpose of simplification and clarity and does not indicate the relationship between various embodiments and/or settings discussed. In addition, the present disclosure provides examples of various specific processes and materials, but those of ordinary skill in the art may be aware of the application of other processes and/or the use of other materials.

Referring to FIG. 1 to FIG. 5, in embodiments of the present disclosure, a control method of a handheld gimbal 100 is implemented by the handheld gimbal 100 and is applied by a handheld device 1000. The handheld gimbal 100 includes a handheld part 10 and a gimbal 20. The gimbal 20 is mounted at the handheld part 10. The gimbal 20 is configured to mount a camera device 200 to photograph a target object. A human-machine interface component 30 is arranged at the handheld part 10. The human-machine interface component 30 includes a display screen 32. The display screen 32 is configured to display an image (i.e., a photographing image) captured by the camera device 200. The image is an image containing the target object. An image, or a photographing image, as used herein, may refer to an entire image captured by the camera device 200 if not specified otherwise. The image of the target object, as used herein, refers to a target portion of the image captured by the camera device 200 corresponding to and depicting the target object.

The control method includes at S10, obtaining a first motion instruction for controlling a motion of the gimbal 20 according to a motion status of the image of the target object and at S20, controlling the motion of the gimbal 20 according to the first motion instruction.

In the control method of the handheld gimbal 100 of embodiments of the present disclosure, the motion of the gimbal 20 may be controlled by the motion status (i.e., the motion status of the target object) of the image of the target object in image(s) captured by the camera device 200, such that the motion of the gimbal 20 may not be delayed too much or too far ahead. As such, the impact on the video recording may be reduced or avoided, and the video quality recorded by the camera device 200 may be ensured.

By mounting the camera device 200 at the handheld gimbal 100, the recording may become more stable, and reduce/prevent shaking motion, such that the recording quality may be improved. The gimbal 20 may drive the camera device 200 to move, that is, the gimbal 20 and the camera device 200 may move synchronously. When the moving target object is captured, the target object may be expected to be in the center of the image. That is, when the target object moves, the gimbal drives the camera device to move to cause the target object to be at a center of the photographing image. Therefore, in embodiments of the present disclosure, the human-machine interface component 30 is added to the handheld part 10 of the handheld gimbal 100. The display screen 32 of the human-machine interface component 30 may display the image of the target object. As such, the motion of the gimbal 20 may be controlled according to the motion status of the image of the target object to ensure the video quality captured by the camera device 200. Controlling the motion of the gimbal 20 may refer to controlling a rotation speed of the gimbal 20. When the target object moves fast, the gimbal 20 may need to follow more tightly to prevent a shaking margin of the gimbal 20 during the rotation, and the gimbal 20 may rotate fast. When the target object moves slowly, the gimbal 20 may need to follow more relaxedly to avoid that the image captured by the camera device 200 is not smooth enough, and the gimbal 20 may rotate slowly.

The display screen 32 of the human-machine interface component 30 may display the image captured by the camera device 200 synchronously.

To understand the handheld gimbal 100 and its control method of embodiments of the present disclosure more clearly, for example, the gimbal 20 may be described as a three-axis gimbal 20. The gimbal 20 includes a first axial assembly 22, a second axial assembly 24, and a third axial assembly 26. The first axial assembly 22 is mounted at the handheld part 10. The second axial assembly 24 is connected to the first axial assembly 22 and the third axial assembly 26. The third axial assembly 26 is configured to mount the camera device 200. A processor 31 of the human-machine interface component 30 may be configured to control movement at least one of the first axial assembly 22, the second axial assembly 24, or the third axial assembly 26 to realize the motion of the gimbal 20.

In some embodiments, the third axial assembly 26 is a pitch axis assembly, the second axial assembly 24 is a roll axis assembly, and the first axial assembly 22 is a yaw axis assembly. The third axial assembly 26 may be configured to connect to the camera device 200 and drive the camera device 200 to rotate around a third axis X. The second axial assembly 24 may be configured to drive the camera device 200 to rotate around a second axis Y. The first axial assembly 22 may be configured to drive an axis arm to rotate to drive the third axial assembly 26 and the second axial assembly 24 to rotate around a first axis Z.

Further, the first motion instruction may include at least one of an angle, an angular speed, and/or an angular acceleration of the motion of the gimbal 20. When the angle and/or the angular speed and/or the angular acceleration of the motion of the gimbal 20 are relatively large, the gimbal 20 may rotate relatively fast. When the angle and/or the angular speed and/or the angular acceleration of the motion of the gimbal 20 are relatively small, the gimbal 20 may rotate relatively slowly.

The angle and/or the angular speed and/or the angular acceleration of the motion of the gimbal 20 may include an angle and/or an angular speed and/or an angular acceleration at one or more of the X, Y, or Z directions.

In some embodiments, the control method may include automatically recognizing the target object in the image. In some embodiments, the display screen 32 includes a tracking box 33. Recognizing the target object in the image automatically includes the tracking box 33 selecting and enclosing the target object in the image automatically, that is, automatically tracking the target object such that the target object is enclosed by the tracking box 33.

Figure 6:
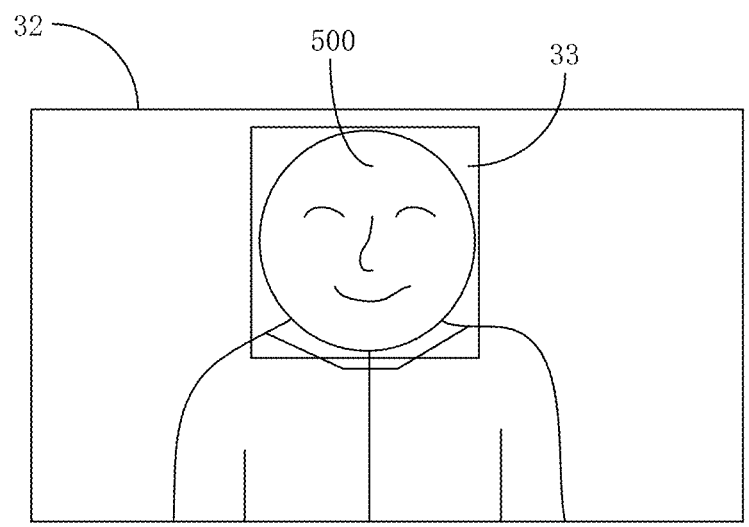
FIG. 6 is a schematic diagram showing an image displayed on a display screen according to some embodiments of the present disclosure.

A specific target object recognition algorithm (e.g., a human face recognition algorithm) may be pre-installed in the human-machine interface component 30. When the camera device 200 at the handheld gimbal 100 captures the target object, the tracking box 33 may be used to automatically select the target object in captured images. For example, as shown in FIG. 6, when the target object is a human face, the display screen 32 of the human-machine interface component 30 may display an image of the human, and the tracking box 33 may automatically frame a human face 500 to enclose the target object in the image. In other examples, the target object may include other objects. The target object recognition algorithm may be realized by using a relevant technology of image processing, which is not described in detail here.

In some other embodiments, the control method includes obtaining a first external instruction and selecting the target object in the image according to the first external instruction. In some embodiments, the display screen 32 includes the tracking box 33, and the first external instruction includes using the tracking box 33 to select the target object in the image.

The display screen may be a touch screen. A user may enter the first external instruction at the display screen 32, that is, perform a box dragging operation (e.g., a starting point and an ending point of the dragging operation are two non-neighboring vertices of the tracking box) to draw the tracking box 33 at a position corresponding to the image of the target object at the display screen 32 to cause the tracking box 33 to select the target object (i.e., enclose the target object with the tracking box 33). After obtaining the first external instruction, the human-machine interface component 30 may use the tracking box 33 to select the target object in the image according to the first external instruction. In some embodiments, the user may also enter the first external instruction from a human-machine interface of an APP installed at a handheld device 1000 to select the target object in the image. The APP may transmit the first external instruction to the human-machine interface component 30. Then, the human-machine interface component 30 may use the tracking box 33 to select the target object according to the first external instruction. The human-machine interface of the APP may be displayed at the display screen of a remote-control device (including but not limited to a remote controller, a cell phone, a tablet, a wearable smart device, etc.) communicating with the handheld device 1000.

In some embodiments, the motion status of the image of the target object may be obtained according to a position change of the tracking box 33 at the display screen 32.

As the target object moves, the image of the target object may change/move along with the target object at the display screen 32 of the human-machine interface component. Since the tracking box 33 is tracking and enclosing the target object, the motion status of the image of the target object may be obtained through the position change of the tracking box 33 at the display screen 32. In some embodiments, for example, using the position of the center of the tracking box 33 at the display screen 32 as the position of the image of the target object, at time T1, the image of the target object may be at position A (x1, y1), and at time T2, the image of the target object may be at position B (x2, y2). The motion status of the image of the target object may be obtained according to the position change of the image of the target object from time T1 to T2, including a moving speed of the target object (including a direction). As such, the first motion instruction of controlling the motion of the gimbal 20 may be obtained according to the moving speed of the target object. The rotation speed of the gimbal 20 may be proportional to the moving speed of the target object. In some embodiments, when the handheld part 10 of the handheld gimbal 100 stays still, the rotation speed of the gimbal 20 may be consistent with the moving speed of the target object.

In some embodiments, the control method includes obtaining a second external instruction and controlling the motion of the gimbal 20 according to the second external instruction.

In some embodiments, the second external instruction may be a selection among candidate options that at least include a first control mode or a second control mode. The first control mode may be a fast-following mode, and the second control mode may be a slow-following mode. The human-machine interface component 30 may further include a touch screen 34. The touch screen 34 may be configured to receive the second external instruction. In some embodiments, the fast-following mode and the slow-following mode each have a corresponding range of rotation speed and/or acceleration. The value range corresponding to the fast-following mode is higher than that corresponding to the slow-following mode. In some embodiment, the fast-following mode may specify a lowest speed limit and/or acceleration limit of the gimbal. The slow-following mode may specify a highest speed limit and/or acceleration limit of the gimbal.

At least two virtual buttons may be arranged at the touch screen 34 of the human-machine interface component 30. One fast virtual button, e.g., a button with a "fast" label, may be configured to enter the first control mode upon being selected, and one slow virtual button, e.g., a button with a "slow" label, may be configured to enter the second control mode upon being selected. The user may determine the moving speed of the target object according to the motion status of the image of the target object. When determining the moving speed of the target object is fast, the user may touch the fast virtual button to enter the second external instruction (the fast-following mode) to cause the gimbal 20 to follow the target object quickly, thus, the gimbal 20 may rotate fast. When determining the moving speed of the target object is slow, the user may touch the slow virtual button to enter the second external instruction (the slow-following mode) to cause the gimbal 20 to follow the target object slowly, thus, the gimbal 20 may rotate slowly. Further, a medium speed virtual button may be arranged at the touch screen 34. A number of the virtual buttons may be set correspondingly according to adjustment levels of the rotation speed of the gimbal 20. In some other embodiments, the handheld part 10 may be provided with a physical button, which may be configured to adjust the rotation speed of the gimbal 20. The second external instruction may be entered through the physical button to control the motion of the gimbal 20.

The human-machine interface component 30 includes the display screen 32 and the touch screen 34. The touch screen 34 may be arranged above the display screen 32. In some embodiments, when the display screen 32 of the human-machine interface component 30 is a touch display screen, the human-machine interface component 30 may not include the touch screen 34.

Figure 7:
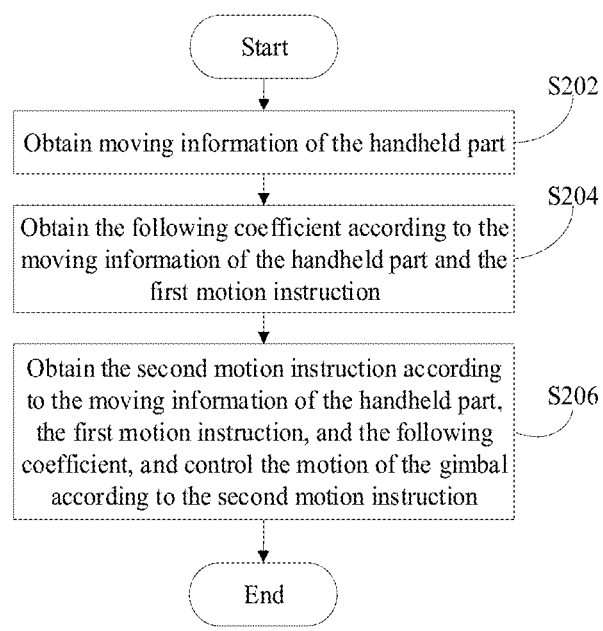
FIG. 7 is a schematic flowchart of another exemplary handheld gimbal control method according to some embodiments of the present disclosure.

As shown in FIG. 7, in some embodiments, process S20 includes: at S202, obtaining moving information of the handheld part 10; at S204, obtaining a following coefficient according to the moving information of the handheld part 10 and the first motion instruction; and at S206, obtaining a second motion instruction according to the moving information of the handheld part 10, the first motion instruction, and the following coefficient, and controlling the motion of the gimbal 20 according to the second motion instruction.

The gimbal 20 may be mounted at the handheld part 10 through a base of the gimbal 20. When the user uses the gimbal to set up the camera device 200 to photograph the moving target object, the user moves the handheld part 10 to change a photographing direction of the camera device 200 to track and photograph the target object. Since the base of the gimbal 20 may be fixedly connected to the handheld part 10, the rotation of the handheld part 10 may drive the base to rotate. In this scenario, the moving information of the handheld part 10 may be obtained first, then, the following coefficient may be obtained according to the moving information of the handheld part 10 and the first motion instruction. Then, the second motion instruction may be obtained according to the moving information of the handheld part 10, the first motion instruction, and the following coefficient to control the motion of the gimbal 20. As such, the gimbal 20 may follow the motion of the handheld part 10 to ensure the video quality captured by the camera device 200.

Further, the following coefficient may be obtained according to any appropriate calculation method, the moving information of the handheld part 10, and the first motion instruction. For example, in some embodiments, the following coefficient may be obtained according to the moving information of the handheld part 10 and the first motion instruction based on a predetermined formula, or a corresponding following coefficient may be obtained based on the predetermined corresponding relationship. Similarly, the second motion instruction may be obtained according to any appropriate calculation method according to the moving information of the handheld part 10, the first motion instruction, and the following coefficient, for example, based on the predetermined formula, corresponding relationship, etc., which are not limited here.

After the gimbal 20 moves with the handheld part 10, the following speed of the gimbal 20 may be adjusted in real-time according to an angle between the gimbal 20 and the handheld part 10. The gimbal 20 may not follow the handheld part 10 at a constant speed. For example, when the angle difference between the gimbal 20 and the handheld part 10 is large, the larger the following coefficient is, the faster the following speed of the gimbal 20 is, such that the gimbal 20 may follow the motion of the handheld part 10 as quickly as possible.

When the handheld part 10 stays still, the moving information of the handheld part 10 and the following coefficient may be considered zero. Thus, the first motion instruction for controlling the motion of the gimbal 20 may be obtained according to the motion status of the image of the target object. The motion of the gimbal 20 may be controlled directly according to the first motion instruction.

In some embodiments, the moving information of the handheld part 10 may include at least one of an angle, an angular speed, and/or an angular acceleration of the handheld part 10.

In some embodiments, the moving information of the handheld part 10 may be obtained by a measurement of an inertial measurement unit (IMU) mounted in the handheld part 10, such as the angle and/or the angular speed and/or the angular acceleration of the handheld part 10. The IMU may be connected to the human-machine interface component 30, which may transmit the measured moving information of the handheld part 10 to the human-machine interface component 30.

Referring to FIG. 1 to FIG. 4, the handheld gimbal 100 of embodiments of the present disclosure includes the handheld part 10 and the gimbal 20. The gimbal 20 is mounted at the handheld part 10. The gimbal 20 is configured to mount/house the camera device 200 to photograph the target object. The human-machine interface component 30 is arranged at the handheld part 10. The human-machine interface component 30 includes processor 31 and the display screen 32. The display screen 32 may be configured to display the image captured by the camera device 200. The image may include the image of the target object. The processor 31 may be configured to obtain the first motion instruction of controlling the motion of the gimbal 20 according to the motion status of the image of the target object and control the motion of the gimbal 20 according to the first motion instruction.

That is, in embodiments of the present disclosure, process S10 and process S20 of the control method of the handheld gimbal may be implemented by the processor 31.

In the handheld gimbal 100 of embodiments of the present disclosure, the motion of the gimbal 20 may be controlled by the motion status of the image of the target object (i.e., the motion status of the target object) in the image(s) captured by the camera device 200, such that the motion of the gimbal 20 may not be delayed too much or too far ahead. As such, the impact on the video recording may be reduced or avoided, and the video quality captured by the camera device 200 may be ensured.

The description of embodiments and beneficial effects of the control method of the handheld gimbal 100 may be also applicable to embodiments of the handheld device 100, to avoid repetition, which is not described in detail here.

In some embodiments, the processor 31 may be configured to recognize the target object automatically.

In some embodiments, the display screen 32 may include a tracking box, which may be used to select the target object automatically.

In some embodiments, the processor 31 may be further configured to obtain the first external instruction and select the target object in the image according to the first external instruction.

In some embodiments, the display screen 32 may include the tracking box, which may be used to select the target object in the image according to the first external instruction.

In some embodiments, the motion status of the image of the target object may be obtained according to the position change of the tracking box at the display screen 32.

In some embodiments, the processor 31 may be further configured to obtain the second external instruction and control the motion of the gimbal 20 according to the second external instruction.

In some embodiments, the second external instruction may be a selection among a plurality of candidate control modes. The candidate control modes at least include the first control mode and the second control mode.

In some embodiments, the first control mode may be the fast-following mode, and the second control mode may be the slow-following mode.

In some embodiments, the human-machine interface component 30 may further include the touch screen 34, which may be configured to receive the second external instruction.

In some embodiments, the processor 31 may be configured to obtain the moving information of the handheld part 10, obtain the following coefficient according to the moving information of the handheld part 10 and the first motion instruction, obtain the second motion instruction according to the moving information of the handheld part 10, the first motion instruction, and the following coefficient, and control the motion of the gimbal 20 according to the second motion instruction.

That is, in embodiments of the present disclosure, process S202, process S204, and process S206 of the control method of the handheld gimbal may be implemented by the processor 31.

In some embodiments, the moving information of the handheld part 10 may include the angle and/or the angular speed and/or the angular acceleration of the handheld part 10.

In some embodiments, the first motion instruction may include the angle and/or the angular speed and/or the angular acceleration of the gimbal 20.

Referring to FIG. 1 to FIG. 4, the handheld device 100 of embodiments of the present disclosure may include the handheld gimbal 100 of any above embodiments.

In the handheld device 1000 of embodiments of the present disclosure, the motion of the gimbal 20 may be controlled by the motion status of the image of the target object (i.e., the motion status of the target object) of the image captured by the camera device 200, such that the motion of the gimbal 20 may not be too far behind or too far ahead. As such, the impact on the video recording may be reduced or avoided, and the video quality captured by the camera device 200 may be ensured.

The descriptions of embodiments and beneficial effects of the control method of the handheld gimbal 100 and the handheld gimbal 100 may be applicable to the handheld device 1000 of embodiments of the present disclosure, to avoid repetition, which is not described in detail.

In some embodiments, the handheld device 1000 may include the camera device 200. The camera device 200 may be mounted at the gimbal 20.

The camera device 200 may include a camera, a video recorder, a mobile terminal having a photographing function (e.g., a smartphone, a tablet, etc.). In the examples of FIGS. 1 to 4, the camera device 200 is the camera.

In some embodiments, the handheld device 1000 may include a load connection piece 300. The load connection piece 300 may be mounted at the gimbal 20 and configured to mount the camera device 200.

The load connection piece 300 may include but be not limited to a clamping connection piece or a magnetic connection piece. In some embodiments, the clamping connection piece may clamp the camera device 200 to fix at the third axial assembly 26. In this case, the third axial assembly 26 may provide a stabilization function for loading the camera device 200 at the third axis X. In some other embodiments, the magnetic connection piece may be arranged with a magnet. Magnetic material may be arranged at the camera device 200, or the camera device 200 may have the magnetic material, such that the camera device may be magnetically attached to the magnetic connection piece. Therefore, the camera device may be easily installed and disassembled, which is easy to use.

In the present specification, the descriptions of the terms of "one embodiment," "some embodiments," "exemplary embodiments," "examples," "specific examples," "some examples," etc., are intended to indicate that specific features, structures, materials or characteristics in combination with embodiments or examples are included in at least one embodiment or example of the present disclosure. In this specification, the schematic representation of the above-described terms does not necessarily refer to same embodiments or examples. Moreover, the specific features, structures, materials, or characteristics described may be combined in any one or more embodiments or examples in a suitable manner.

Any process or method description described in the flowchart or described in other manners may be understood as a module, segment, or part of code that includes one or more executable instructions for performing specific logical functions or steps of the process. The scope of embodiments of the present disclosure includes additional executions, which may not execute the functions in the order shown or discussed, including in a substantially simultaneous manner or in the reverse order according to the functions involved. This should be understood by those skilled in the art of embodiments of the present disclosure.

The logic and/or steps represented in the flowchart or described in other manners here, for example, may be considered as a sequenced list of executable instructions for executing logic functions and may be executed in any computer-readable medium, for use by instruction execution systems, devices, or equipment (such as computer-based systems, systems including processors, or other systems that can fetch instructions from instruction execution systems, devices, or equipment and execute the instructions), or combining these instruction execution systems, devices, or equipment. For the present specification, a "computer-readable medium" may be any device that can contain, store, communicate, propagate, or transmit a program for use by an instruction execution system, device, or equipment or in combination with these instruction execution systems, devices, or equipment. More specific examples (non-exhaustive list) of computer-readable media may include an electrical connection (an electronic device) with one or more wirings, a portable computer disk case (a magnetic device), random access memory (RAM), read-only memory (ROM), erasable and editable read-only memory (EPROM or flash memory), a fiber optic device, and portable compact disk read-only memory (CDROM). In addition, the computer-readable medium may even be paper or other suitable media on which the program can be printed, because the program may be obtained electronically by, for example, optically scanning the paper or other media, and then editing, interpreting, or other suitable media if necessary. Then, the program may be stored in a computer storage device.

Each part of the present disclosure may be executed by hardware, software, firmware, or a combination thereof. In the above embodiments, multiple steps or methods may be executed by software or firmware stored in a memory and executed by a suitable instruction execution system. For example, if the steps or methods are executed by hardware, as in another embodiment, they may be executed by anyone or a combination of the following technologies known in the art: a discrete logic circuit of a logic gate circuit for performing logic functions on data signals, an application-specific integrated circuit with suitable combinational logic gates, a programmable gate array (PGA), a field-programmable gate array (FPGA), etc.

Those of ordinary skill in the art may understand that all or part of the steps carried in the above embodiments may be completed by a program instructing relevant hardware. The program may be stored in a computer-readable storage medium. When executed, the program may include one of the steps of method embodiments or a combination thereof.

In addition, each functional unit in each embodiment of the present disclosure may be integrated into one processing module, or each unit may exist alone physically, or two or more units may be integrated into one module. The above-described integrated modules may be executed in the form of hardware or software function modules. If the integrated module is executed in the form of a software function module and sold or used as an independent product, the functional units may also be stored in a computer-readable storage medium.

The above-described storage medium may be a read-only memory, a magnetic disk, an optical disk, etc. Although embodiments of the present disclosure are shown and described above, the above embodiments are exemplary and should not be considered as limitations of the present disclosure. Those of ordinary skill in the art may change, modify, replace, and transform the above-described embodiments in the scope of the present disclosure.

What is claimed is:

1. A handheld gimbal comprising:
    a handheld part configured with a human-machine interface component; and
    a gimbal mounted at the handheld part and configured to mount a camera device to photograph a target object;
    wherein the human-machine interface component includes:
        a display screen configured to display a photographing image captured by the camera device, the photographing image including an image of the target object; and
        a processor configured to:
            automatically recognize the target object;
            obtain a motion instruction of controlling a motion of the gimbal according to a motion status of the image of the target object; and
            control the motion of the gimbal according to the motion instruction.

2. The handheld gimbal of claim 1, wherein the processor is further configured to:
    when the target object moves, control the gimbal to drive the camera device to move to cause the target object to be at a center of the photographing image.

3. The handheld gimbal of claim 1, wherein the gimbal includes:
    a first axial assembly mounted at the handheld part;
    a second axial assembly connected to the first axial assembly and a third axial assembly; and
    the third axial assembly configured to mount the camera device.

4. The handheld gimbal of claim 1, wherein the display screen includes a tracking box used to automatically select the target object in the photographing image.

5. The handheld gimbal of claim 1, wherein the processor is further configured to:
    obtain a first external instruction; and
    select the target object in the photographing image according to the first external instruction.

6. The handheld gimbal of claim 5, wherein the display screen includes a tracking box used to select the target object in the photographing image according to the first external instruction.

7. The handheld gimbal of claim 6, wherein the motion status of the image of the target object is obtained according to a position change of the tracking box at the display screen.

8. The handheld gimbal of claim 1, wherein the processor is further configured to:
    obtain a second external instruction; and
    control the motion of the gimbal according to the second external instruction.

9. The handheld gimbal of claim 8, wherein the second external instruction includes a selection from at least a first control mode and a second control mode.

10. The handheld gimbal of claim 9, wherein the first control mode is a fast-following mode, and the second control mode is a slow-following mode.

11. The handheld gimbal of claim 8, wherein the human-machine interface component further includes a touch screen configured to receive the second external instruction.

12. The handheld gimbal of claim 1, wherein the motion instruction is a first motion instruction and the processor is further configured to:
    obtain moving information of the handheld part;
    obtain a following coefficient according to the moving information of the handheld part and the first motion instruction;
    obtain a second motion instruction according to the moving information of the handheld part, the first motion instruction, and the following coefficient;
    control the motion of the gimbal according to the second motion instruction.

13. The handheld gimbal of claim 1, wherein the motion instruction includes at least one of an angle, an angular speed, or an angular acceleration of the motion of the gimbal.

14. A handheld device comprising a handheld gimbal including:
    a handheld part configured with a human-machine interface component; and
    a gimbal mounted at the handheld part and configured to mount a camera device to photograph a target object;
    wherein the human-machine interface component includes:
        a display screen configured to display a photographing image captured by the camera device, the photographing image including an image of the target object; and
        a processor configured to:
            automatically recognize the target object;
            obtain a motion instruction of controlling a motion of the gimbal according to a motion status of the image of the target object; and
            control the motion of the gimbal according to the motion instruction.

15. The device of claim 14, further comprising the camera device mounted at the gimbal.

16. The device of claim 15, further comprising:
    a load connection piece mounted at the gimbal and configured to mount the camera device.

17. A handheld gimbal comprising:
    a handheld part configured with a human-machine interface component; and
    a gimbal mounted at the handheld part and configured to mount a camera device to photograph a target object;
    wherein the human-machine interface component includes:
        a display screen configured to display a photographing image captured by the camera device, the photographing image including an image of the target object; and
        a processor configured to:
            obtain a motion instruction of controlling a motion of the gimbal according to a motion status of the image of the target object; and
            control the motion of the gimbal according to the motion instruction.

18. The handheld gimbal of claim 17, wherein the display screen includes a tracking box used to select the target object in the photographing image according to a first external instruction.

19. The handheld gimbal of claim 17, wherein the processor is further configured to obtain a second external instruction and control the motion of the gimbal according to the second external instruction.

* * * * *